United States Patent
Takamizawa et al.

[15] 3,642,596
[45] Feb. 15, 1972

[54] PROCESS FOR PREPARING ORGANOCHLOROSILANES

[72] Inventors: Minoru Takamizawa; Takayoshi Hayashi; Kazumoto Uzawa; Masatoshi Takita; Yoshiaki Kudo, all of Gunma-ken, Japan

[73] Assignee: Shinetsu Chemical Company, Tokyo, Japan

[22] Filed: Sept. 2, 1969

[21] Appl. No.: 854,716

[30] Foreign Application Priority Data

Sept. 6, 1968 Japan..................................43/64131
May 1, 1969 Japan..................................44/33808
July 26, 1969 Japan..................................44/59226

[52] U.S. Cl. ..........................................204/158, 204/162
[51] Int. Cl. ..........................................B01j 1/10
[58] Field of Search.................................204/158 R, 162

[56] References Cited

UNITED STATES PATENTS 3,188,336   6/1965   Haszeldine..........................204/181

*Primary Examiner*—Howard S. Williams
*Attorney*—McGlew and Toren

[57] ABSTRACT

Aromatic group containing organochlorosilanes are prepared by irradiating, in the presence of chlorine, a mixture of chlorosilanes of the formula

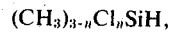
$(CH_3)_{3-n}Cl_nSiH$, wherein $n$ is 2 or 3 and aromatic compounds. The irradiation is carried out with light, at least 30 percent of the light having a wavelength not exceeding 3,800 A. A wide variety of aromatic group containing organochlorosilanes are selectively obtained by the inventive process with high yields. Further, the formation of byproducts, which are difficult to separate and/or which have no utility, is effectively prevented.

7 Claims, No Drawings

PROCESS FOR PREPARING ORGANOCHLOROSILANES

FIELD OF THE INVENTION

This invention relates to an improved process for preparing,—from chlorosilanes containing a Si–H bond and aromatic compounds,—organochlorosilanes containing aromatic radicals or groups. Organochlorosilanes containing aromatic radicals or groups, such as diphenyldichlorosilane or phenyltrichlorosilanes, are important starting materials for silicone oils, silicon varnishes and silicone rubbers.

PRIOR ART

The following four procedures have previously been used for preparing aromatic group containing organochlorosilanes:

a. Grignard's method which is practiced by reacting aryltrichlorosilane with halogenated methyl magnesium, or methyltrichlorosilane with halogenated aryl magnesium, for the purpose of obtaining aryl methyldichlorosilane; alternatively, silicon tetrachloride is reacted with halogenated aryl magnesium for the purpose of obtaining aryl trichlorosilane.

b. A method which is practiced by dehydrogenating methyldichlorosilane or trichlorosilane, together with aromatic hydrocarbons, employing boron chloride as a catalyst; or dehydrochlorinating such chlorosilanes by employing chlorinated aromatic hydrocarbons.

c. Direct method which is practiced by reacting metallic silicon with chlorobenzene so as to obtain phenylchlorosilanes.

d. Disproportionation method which is practiced by reacting phenyltrichlorosilane obtained by Direct method with trimethyl chlorosilane.

All four prior art procedures have, however, serious drawbacks. Grignard's method of (a) above has the disadvantage that it requires a large quantity of ether. Further, it is difficult to remove byproducts, a fact which greatly complicates the process. In respect to method (b), the dehydrogenation and dehydrochlorination have to be conducted at high temperature and/or under high pressures which requires elaborate equipment. Regarding method (c), when the Direct method is adopted, phenyltrichlorosilane, which is the desired product, is obtained merely as a byproduct of diphenyldichlorosilane in small quantity. Particularly when the phenyl group has various substitution radicals, the synthesis by this Direct method often becomes extremely difficult to carry out. Concerning method (d), the Disproportionation reaction method has the disadvantage of having to be practiced under the severe conditions of high temperatures and high pressures, and the reaction product contains unreacted phenyltrichlorosilane which can be separated with great difficulty only.

It has also been suggested as a method for preparing silanes of this kind (cf. specification of U.S.S.R. Pat. No. 162,842) that a mixture of aromatic hydrocarbons and hydrogen chlorosilane, e.g., a mixture of benzene and methyldichlorosilane or of benzene and trichlorosilane, be irradiated with light coming from the source of an incandescent electric lamp, thereby obtaining phenyl methyl dichlorosilane or phenyltrichlorosilane. By this method it is possible to obtain the desired product, unaccompanied by any byproduct which is difficult to separate. However, the yield rate of the desired product, to wit, organochlorosilane containing aromatic radicals or groups, to hydrogen chlorosilane is low. For example, in the synthesis of phenyl methyl dichlorosilane, the yield rate is 12 percent by weight, and in that of phenyltrichlorosilane, about 39 percent by weight. Even more disadvantageous is in the former case that most of the methyl dichlorosilane turns into worthless methyltrichlorosilane. In the latter case, the unreacted material is converted into worthless silicon tetrachloride. Further, it is difficult to prepare by this method organochlorosilanes having variable aromatic radicals. The only compounds which can be readily prepared are phenylchlorosilane and phenyl methyl dichlorosilane.

SUMMARY OF THE INVENTION

An object of the present invention is to provide a process, free from the above drawbacks, for preparing organochlorosilanes containing aromatic radicals or groups.

Another object of the invention is to provide a process for preparing organochlorosilanes containing variable aromatic radicals, from chlorosilanes having a Si–H bond and aromatic compounds.

A still further object of the invention is to provide a process for preparing such organochlorosilanes at high yield rates, unaccompanied, as much as possible, by byproducts which are hard to separate or of little utility value.

The inventive process is characterized by mixing chlorosilanes containing a Si–H bond and represented by the general formula $$(CH_3)_{3-n}Cl_nSiH,$$

wherein $n$ is an integer of 2 or 3 and an aromatic compound which is represented by the general formula

wherein Z is hydrogen, halogen, or a monovalent organic radical selected from the group consisting of alkyl, haloalkyl, alkoxy, phenyl, halophenyl, phenoxy, phenylmethylene and dialkylamino, and irradiating the mixture, in the presence of chlorine, with light, at least 30 percent of the light having a wavelength not exceeding 3,800 A. By this process, under the conditions of atmospheric pressure and room temperature, organochlorosilanes having variable aromatic radicals can be prepared at good yield rates, accompanied by a minimum amount of byproducts, such as silicon tetrachloride or methyltrichlorosilane, which are of little utility value.

The invention is based on the observation that when the substituted radical, Z, of the aromatic hydrocarbons of the above general formula, is an electron-attractive radical, such as nitro, cyano, carbonyl or trifluoromethyl, the desired reaction will not proceed. By contrast, if said Z is an electron-donative radical, to wit a donor, or a weak electron-attractive radical, such as hydrogen, halogen, alkyl, haloalkyl, alkoxy, halophenyl, phenoxy, phenylmethylene or dialkylamino radicals, the following reaction will rapidly take place, when the mixture is irradiated by the aforementioned light rays:

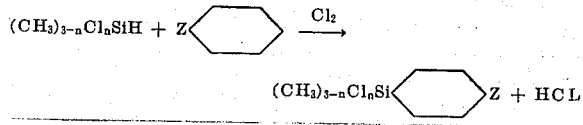

The preparation, by this process, of organochlorosilane, containing aromatic radicals, is presumably carried out first by the occurrence of free radicals due to the primary photolysis of chlorine molecules, ($Cl_2 \rightarrow 2Cl \cdot$), in the reaction system. Said free radicals are supposed to cause hydrogen atoms to isolate themselves from chlorosilanes having Si–H bond, yielding chlorosilyl radicals, which, in turn, react with the benzene nucleus in the aromatic compounds. It was observed in respect to the light source needed for causing the reaction to proceed that, although the chlorine atoms absorbed light covering a wide range of wavelengths with 3,300 A. as the peak, if a large quantity of light with wavelengths of above 5,000 A. was used, the formation of byproducts such as silicon tetrachloride is promoted. Accordingly, in order to prepare only the desired product, viz., organochlorosilanes having aromatic radicals, and at the best yield rate, at least 30 percent, and preferably more than 40 percent, of the radiation light should have a wave length not exceeding 3,800 A. This will be apparent from the fact that when an incandescent light, about 0.5 percent of whose rays have a wavelength not exceeding 3,800 A., is employed,—a reaction by which, for example, some phenyltrichlorosilane is prepared,—the reaction takes place. However, in such a case, the quantity of light rays whose wavelengths are above 5,000 A. is comparatively large, so that the quantity of silicon tetrachloride formed as byproduct is much increased, as compared with the production of the desired phenyltrichlorosilane, resulting in turn in a great reduction of phenyltrichlorosilane formation. By the process of the invention, however, phenyltrichlorosilane can be prepared with a yield as high as 70 percent or even more.

A satisfactory light source to be employed in the process of the invention and fulfilling the required conditions may, for example, be a high-pressure mercury lamp, a low-pressure mercury lamp, a xenon arc lamp or a hydrogen arc lamp.

The chlorosilane, which is one of the principal starting materials in practicing the process of the invention, is represented by the general formula:

$$(CH_3)_{3-n}Cl_nSiH,$$

wherein $n$ is an integer of 2 or 3, and may be exemplified by trichlorosilane and methyldichlorosilane, of which the former is preferred because of its good reactivity.

The other reactant, to wit the aromatic compound, is represented by the general formula:

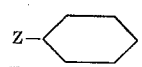

wherein Z is hydrogen, halogen or a monovalent organic radical such as alkyl, haloalkyl, alkoxy, phenyl halophenyl, phenoxy, phenylmethylene and dialkylamino radicals. The compounds may be exemplified by benzene or derivatives which have in their benzene nuclei, halogen atoms such as chlorine, fluorine, iodine and bromine, or saturated aliphatic hydrocarbon radicals containing at most 12 carbon atoms, such as methyl, ethyl, propyl, butyl and dodecyl, or haloalkyl radicals such as chloromethyl, $\beta$-chloroethyl, $\gamma$-chloropropyl, $\gamma$-dichloropropyl, $\gamma$-trichloropropyl, $\beta$-fluoroethyl, $\gamma$-fluoropropyl, $\gamma$-difluoropropyl and $\gamma$-trifluoropropyl, or alkoxy radicals such as methoxy, ethoxy, propoxy and buthoxy, or halophenyl radicals such as chlorophenyl, or dialkylamino radicals such as dimethyl amino, diethyl amino, dipropyl amino and dibutyl amino.

Chlorosilanes having Si—H bond and aromatic compounds may be mixed in the mole ratio of from 5:95 to 90:10, or more preferably, from 10:90 to 70:30. Chlorine, in whose presence the reaction is to be carried out, is supplied, in gaseous phase, to the bottom of the mixture of the above chlorosilanes and aromatic compounds. The amount of chlorine should not be so great so as to cause escape of chlorine in gaseous phase. The radiation reaction may be carried out while the chlorine is being absorbed by the liquid layer. If the chlorine gas has been diluted beforehand with an inert gas such as nitrogen, its absorption by the mixed liquids will take place more uniformly, giving favorable results. The amount of chlorine affects the reaction velocity, so that it may be regulated in accordance with the scale of the reaction, but generally speaking, the quantity of the chlorine supplied throughout the reaction process may be 0.1–3 moles per mole of Si–H radical, or more preferably 0.2–2 moles. As to the reaction time, it may be 0.5–25 hours, or more preferably, 1–10 hours. The quantity of light employed in irradiation may be large enough to generate free radicals (Cl ·) in such a quantity as to have the reaction of the invention proceed, viz, 1–1,000 watt or, more preferably 5–500 watt per kg of the reaction liquid.

For economy's sake it is preferred that the reaction is carried out at room temperature and atmospheric pressure. However, the success of the reaction is not impaired even if the temperature should rise during operation and while the reaction continuously takes place.

The invention will now be described by several examples, in which the parts are all parts by weight.

EXAMPLE 1

In the center of a reactor equipped with a reflux cooler, a thermometer and a gas pipe, was installed a 100 watt high-pressure mercury lamp. 54 percent of the rays emitted by the light have wave lengths not exceeding 3,800 A. The lamp is so devised as to be cooled on all sides with flowing water. In the reactor were charged 271 parts of trichlorosilane and 1,404 parts of benzene. After the charge was stirred, the atmosphere inside the reactor was replaced by nitrogen gas, and the mercury lamp was lighted. At the same time, chlorine gas was introduced to the bottom of the mixed liquid layer, thereby carrying out the reaction for 3 hours, obtaining 1,711 parts of a product consisting of the components given below. The yield rate of phenyltrichlorosilane to the raw material trichlorosilane was 73 percent.

| | |
|---|---|
| Trichlorosilane | 1.9 weight percent |
| Silicon tetrachloride | 1.1 weight percent |
| Benzene | 60.8 weight percent |
| Phenyltrichlorosilane | 15.8 weight percent |
| Substance with high boiling point | 20.4 weight percent |

CONTROL 1

An experiment similar to the one described in Example 1 was conducted, with the sole difference that a 100 watt incandescent electric lamp was used (0.5 percent of the rays emitted by the lamp had wave lengths not exceeding 3,800 A.) instead of the 100-watt high-pressure mercury lamp. 1,720 parts of the product consisting of the components given below were obtained. The yield rate of phenyltrichlorosilane to the raw material trichlorosilane was only 38.6 percent.

| | |
|---|---|
| Trichlorosilane | 1.9 weight percent |
| Silicon tetrachloride | 7.7 weight percent |
| Benzene | 65.7 weight percent |
| Phenyltrichlorosilane | 8.4 weight percent |
| Substance with high boiling point | 16.5 weight percent |

EXAMPLES 2–5 and CONTROLS 2–3

In the center of a reactor like the one employed in Example 1 was installed a 100-watt high-pressure mercury lamp (54 percent of the rays emitted by which had wave lengths not exceeding 3,800 A.) which was so devised as to be cooled on all sides with flowing water. In the reactor were charged trichlorosilane and various aromatic compounds in the mole ratio of 1:1. While chlorine was being supplied at the rate given in Table 1, the reaction was carried out for 5 hours, obtaining the results given in Table 1.

As Controls 2 and 3, similar experiments were repeated in which the only difference was the replacement of the 100-watt high-pressure mercury lamp by a 100-watt incandescent electric lamp, obtaining the results also given in Table 1.

TABLE 1

| Number | Examples | | | | Controls | |
|---|---|---|---|---|---|---|
| | 2 | 3 | 4 | 5 | 2 | 3 |
| Kind of aromatic compounds (A) | Benzene | Chlorobenzene | Toluene | Diphenylether | Benzene | Chlorobenzene |
| Quantity of trichlorosilane charged (parts) | 1,355 | 542 | 542 | 393 | 1,355 | 542 |
| Quantity of A charged (parts) | 780 | 450 | 368 | 493 | 780 | 450 |
| Quantity of chlorine supplied (parts/hr.) | 54.3 | 25 | 23.1 | 22.5 | 54.3 | 25 |
| Reaction product to be obtained (B) | Phenyltrichlorosilane | Chlorophenyl trichlorosilane | Tolyltrichlorosilane | Phenoxyphenyl trichlorosilane | Phenyltrichlorosilane | Chlorophenyl trichlorosilane |
| Quantity of reaction liquid obtained (parts) | 2,197 | 1,000 | 940 | 890 | 2,240 | 992 |

TABLE 1—Continued

| Number | Examples | | | | Controls | |
|---|---|---|---|---|---|---|
| | 2 | 3 | 4 | 5 | 2 | 3 |
| Analysis of obtained liquid (percent): | | | | | | |
| Trichlorosilane | 30.2 | 25.4 | 37.5 | 19.4 | 29.8 | 27.3 |
| Silicontetrachloride | 3.4 | 5.5 | 3.6 | 5.0 | 17.5 | 15.4 |
| Unreacted A | 23.1 | 30.3 | 25.4 | 41.5 | 24.5 | 38.3 |
| Quantity of B prepared | 31.4 | 31.2 | 18.4 | 28.9 | 15.9 | 14.8 |
| Substance with high-boiling point | 11.9 | 7.6 | 9.7 | 5.2 | 12.3 | 4.2 |
| Benzyl chloride | | | 5.4 | | | |
| Yield rate of B to trichlorosilane (percent) | 64 | 60 | 57 | 52 | 23.3 | 29.9 |

CONTROL 4

An experiment was conducted, similar to the one in Example 5, in which 0.5 percent aqueous solution of potassium bichromate was employed instead of water for cooling the high-pressure mercury lamp. In this manner about 80 percent of the total rays emitted by the lamp had wave lengths of 5,400–5,800 A. while 19 percent of the light had wave lengths not exceeding 3,800 A. Upon completion of the reaction, the reaction product was refined. The result was that the desired phenoxyphenyl trichlorosilane was obtained as a mere trace and nothing but 250 parts of silicon tetrachloride and 440 parts of diphenyl ether were recovered.

CONTROL 5

Into a reactor similar to the one employed in Example 1 were charged 542 parts of trichlorosilane and 492 parts of nitrobenzene in the mole ratio of 1:1. A 100-watt high-pressure mercury lamp, which was so devised as to be cooled on all sides with flowing water, was lighted, and at the same time chlorine was fed into the reactor at the rate of 23.3 parts per hour. The reaction was conducted while the contents of the reactor were stirred, obtaining the result that nitrobenzene remained unchanged and only trichlorosilane turned into silicon tetrachloride. When benzotrifluoride was employed instead of nitrobenzene in a similar experiment, only trichlorosilane turned into silicon tetrachloride.

EXAMPLES 6–9 and CONTROL 6

Into a reactor used in Example 1 were charged methyldichlorosilane and various aromatic compounds in the mole ratio of 1:1. The light source described in Example 1 was employed. The reaction was carried out as in Examples 2–5, obtaining the results given in Table 2.

Another experiment was conducted as Control 6, in which all the conditions were the same as in Example 6, except that instead of a 100-watt high-pressure mercury lamp, a 100-watt incandescent electric lamp was used. The result is indicated in Table 2. When still another experiment was conducted, just as in Example 9, except that a 100-watt incandescent electric lamp was used instead of a 100-watt high-pressure mercury lamp, only a tract of phenoxydiphenyl methyl dichlorosilane, which was the desired product, was obtained, and nothing but silicon tetrachloride as a byproduct and unreacted methyldichlorosilane and diphenyl ether, were recovered.

TABLE 2

| Number | Examples | | | | Control |
|---|---|---|---|---|---|
| | 6 | 7 | 8 | 9 | 6 |
| Kind of aromatic compounds (A) | Benzene | Chlorobenzene | Toluene | Diphenylether | Benzene |
| Quantity of methyldichlorosilane charged (parts) | 230 | 506 | 575 | 403 | 230 |
| Quantity of A charged (parts) | 156 | 495 | 460 | 597 | 156 |
| Quantity of chlorine supplied (parts/hr.) | 15 | 25 | 25 | 25 | 15 |
| Reaction product to be obtained (B) | Phenylmethyl dichlorosilane | Chlorophenylmethyl dichlorosilane | Tolylmethyl dichlorosilane | Phenoxyphenylmethyldichlorosilane | Phenylmethyldichlorosilane |
| Quantity of reaction liquid obtained (parts) | 402 | 1,033 | 1,085 | 1,030 | 408 |
| Analysis of obtained liquid (percent): | | | | | |
| Methyldichlorosilane | 28.6 | 24.7 | 28.7 | 21.6 | 20.3 |
| Methyltrichlorosilane | 14.2 | 12.7 | 10.5 | 6.9 | 34.0 |
| Unreacted A | 27.9 | 37.2 | 29.2 | 48.4 | 32.8 |
| Quantity of B prepared | 23.3 | 20.1 | 17.7 | 16.0 | 7.4 |
| Benzyl chloride | | | 5.6 | | |
| Substance with high boiling point | 6.0 | 5.3 | 8.3 | 7.1 | 5.5 |
| Yield rate of B to methyldichlororosilane | 49.0 | 42.0 | 40.7 | 37.0 | 12.4 |

EXAMPLE 10

An experiment was conducted just as in Example 6, except that chlorine was introduced into the bottom of the reactor at the rate of 47 parts per hour, and the reaction was conducted for 5 hours, obtaining 435 parts of product consisting of the components given below. The yield rate of phenylmethyldichlorosilane to methyldichlorosilane was 44.0 percent.

| | |
|---|---|
| Methyldichlorosilane | 7.3 weight percent |
| Methyltrichlorosilane | 23.2 weight percent |
| Benzene | 23.5 weight percent |
| Phenylmethyldichlorosilane | 33.3 weight percent |
| Substance with high boiling point | 12.7 weight percent |

It is to be noted that in the reaction, the quantity of chlorine introduced to the bottom of the mixed liquid layer was large, so that a part of it was not absorbed by the liquid layer but reached the top of the layer and caused vapor phase reaction to take place, turning the contents of the reactor darkish yellow.

EXAMPLE 11

In a reactor like the one employed in Example 6 were charged 690 parts of methyldichlorosilane and 468 parts of benzene, and a 100-watt high-pressure mercury lamp (so devised as to be cooled with flowing water on all sides) was lighted, and at the same time, chlorine was introduced to the bottom of the layer of the mixed liquids at the rate of 53 parts per hour, and the reaction was continued for 5 hours. The reaction product obtained proved to consist of the components given below, and the yield rate of phenylmethyldichlorosilane to methyldichlorosilane was 48.0 percent.

| | |
|---|---|
| Methyldichlorosilane | 18.3 weight percent |
| Methyltrichlorosilane | 17.5 weight percent |
| Benzene | 25.6 weight percent |
| Phenylmethyldichlorosilane | 29.3 weight percent |
| Substance with high boiling point | 9.3 weight percent | after the mixture was stirred, the atmosphere inside the reactor was replaced by nitrogen gas. On lighting the light source, chlorine gas was introduced to the bottom of the mixed liquid layer at the rate of 21.6 parts per hour. The reaction was carried out for 5 hours, obtaining the results given in Table 3.

TABLE 3

| Number | Examples | | | Controls | | |
|---|---|---|---|---|---|---|
| | 13 | 14 | 15 | 8 | 9 | 10 |
| Light source | 10 w. low-pressure mercury lamp. | 100 w. high-pressure mercury lamp. | 100 w. high-pressure mercury lamp. | 100 w. high-pressure mercury lamp. | 100 w. high-pressure mercury lamp. | 100 w. incandescent electric lamp. |
| Cooling method | Air-cooled. | Water-cooled. | Cooled with aqueous solution of $NiCl_2 6H_2O$ : 1 kg./l. | Cooled with aqueous solution of saturated $CuSO_4$ (25° C.). | Cooled with aqueous solution of 0.5% $K_2Cr_2O_7$. | Water-cooled. |
| Rate of rays having wavelengths not exceeding 3,800 A. | 92 | 54 | 36 | 27 | 19 | 0.5 |
| Quantity of reaction liquid obtained (parts) | 692 | 690 | 690 | 696 | 703 | 704 |
| Analysis of obtained liquid (percent): | | | | | | |
| Methyldichlorosilane | 28.7 | 28.6 | 28.6 | 28.4 | 28.1 | 28.0 |
| Methyltrichlorosilane | 10.5 | 12.1 | 14.5 | 27.6 | 34.5 | 34.7 |
| Benzene | 28.4 | 28.4 | 28.4 | 28.1 | 27.8 | 27.8 |
| Phenylmethyldichlorosilane | 25.2 | 24.9 | 22.4 | 10.0 | 6.1 | 5.7 |
| Substance with high boiling point | 7.2 | 6.0 | 6.1 | 5.9 | 3.5 | 3.8 |
| Yield rate of phenylmethyldichlorosilane to methyldichlorosilane | 51.1 | 50.3 | 45.3 | 20.3 | 12.6 | 11.8 |

EXAMPLE 12

In a reactor like the one employed in Example 6 were charged 460 parts of methyldichlorosilane and 312 parts of benzene, and on lighting a 100-watt high-pressure mercury lamp (so devised as to be cooled with flowing water on all sides), chlorine was introduced to the bottom of the mixed liquid layer at the rate of 47 parts per hour. The reaction was conducted for 5 hours, while the reaction temperature was kept at 40°–50° C. 833 parts of the product obtained proved to consist of the components given below. The yield rate of phenylmethyldichlorosilane to methyldichlorosilane was 46.4 percent.

| | |
|---|---|
| Methyldichlorosilane | 11.7 weight percent |
| Methyltrichlorosilane | 18.2 weight percent |
| Benzene | 26.5 weight percent |
| Phenylmethyldichlorosilane | 33.5 weight percent |
| Substance with high boiling point | 10.1 weight percent |

CONTROL 7

An experiment was conducted similar to the one in Example 12, in which 0.5 percent aqueous solution of potassium bichromate was employed instead of water for cooling the high-pressure mercury lamp. In this manner about 80 percent of the total rays emitted from the lamp has wavelengths of 5,400–5,800 A., while 19 percent of the light had wavelengths not exceeding 3,800 A. Upon completion of the reaction, the product obtained proved to consist of the components given below, and the yield rate of phenylmethyldichlorosilane to methyldichlorosilane was as low as 11.6 percent. The quantity of methyl trichlorosilane byproduced was very large.

| | |
|---|---|
| Methyldichlorosilane | 1.3 weight percent |
| Methyltrichlorosilane | 48.0 weight percent |
| Benzene | 28.5 weight percent |
| Phenylmethyldichlorosilane | 10.5 weight percent |
| Substance with high boiling point | 11.7 weight percent |

EXAMPLES 13–15 and CONTROLS 8–10

In the center of a reactor equipped with a reflux cooler, a thermometer and a gas pipe, was placed a light source, so devised as to be cooled on all sides, by a cooling method of the kind indicated in Table 3. Into the reactor were charged 403 parts of methyldichlorosilane and 273 parts of benzene, and

What is claimed is:

1. A process of preparing aromatic group containing organochlorosilanes, which comprises irradiating, in the presence of chlorine, a mixture of
   a. chlorosilanes containing a Si—H bond and being represented by the general formula—

$$(CH_3)_{3-n}Cl_nSiH,$$

wherein $n$ is an integer of 2 or 3 and
   b. an aromatic compound of the general formula

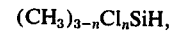

wherein Z is hydrogen, halogen or a monovalent organic radical selected from the group consisting of alkyl, haloalkyl, alkoxy, phenyl, halophenyl, phenoxy, phenylmethylene and dialkylamino, said irradiation being carried out with light, at least 30 percent of said light having a wavelength not exceeding 3,800 A.

2. The process of claim 1, in which the chlorosilanes and the aromatic compound are mixed in the mole ratio of from 5:95 to 90:10.

3. The process of claim 1, in which the chlorine introduced into the mixture is diluted with inert gas.

4. The process of claim 1, in which the quantity of chlorine supplied is from 0.1 to 3 mole per mole of Si–H bond in the chlorosilanes.

5. The process of claim 1, in which the amount of light emitted from the light source is from 1 to 1,000 watts per kg. of the reactants in the mixture.

6. A process of preparing aromatic group containing organochlorosilanes, which comprises irradiating, in the presence of chlorine, a mixture of
   a. methyl hydrogen dichlorosilane and
   b. an aromatic compound of the formula

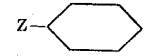

wherein Z is hydrogen, halogen or a monovalent organic radical selected from the group consisting of alkyl, haloalkyl, alkoxy, phenyl, halophenyl, phenoxy, phenylmethylene and dialkylamino, said irradiation being carried out with light, at least 40 percent of said light having a wavelength not exceeding 3,800 A.

7. A process of preparing aromatic group containing organochlorosilanes, which comprises irradiating, in the presence of chlorine, a mixture of
a. trichlorosilane and
b. an aromatic compound of the formula

wherein Z is hydrogen, halogen or a monovalent organic radical selected from the group consisting of alkyl, haloalkyl, alkoxy, phenyl, halophenyl, phenoxy, phenylmethylene and dialkylamino radicals, said irradiation being carried out with light, at least 40 percent of said light having a wave length not exceeding 3,800 A.

* * * * *